US011673807B2

United States Patent

(12) United States Patent
Zaplotnik et al.

(10) Patent No.: US 11,673,807 B2
(45) Date of Patent: Jun. 13, 2023

(54) CARBON NANOSTRUCTURED MATERIALS AND METHODS FOR FORMING CARBON NANOSTRUCTURED MATERIALS

(71) Applicants: Jožef Stefan Institute, Ljubljana (SI); NATIONAL UNIVERSITY CORPORATION TOKAI NATIONAL HIGHER EDUCATION AND RESEARCH SYSTEM, Nagoya (JP)

(72) Inventors: Rok Zaplotnik, Ljubljana (SI); Miran Mozetic, SI-1000 Ljubljana (SI); Gregor Primc, Ljubljana (SI); Alenka Vesel, Ljubljana (SI); Masaru Hori, Nagoya (JP)

(73) Assignee: National University Corporation Tokai National Higher Education and Research System, Nagoya (JP)

( * ) Notice: Subject to any disclaimer, the term of this patent is extended or adjusted under 35 U.S.C. 154(b) by 202 days.

(21) Appl. No.: 17/251,547

(22) PCT Filed: Jun. 11, 2018

(86) PCT No.: PCT/EP2018/065365
§ 371 (c)(1),
(2) Date: Dec. 11, 2020

(87) PCT Pub. No.: WO2019/238206
PCT Pub. Date: Dec. 19, 2019

(65) Prior Publication Data

US 2021/0253430 A1 Aug. 19, 2021

(51) Int. Cl.

| | |
|---|---|
| ***C01B 32/18*** | (2017.01) |
| ***B82Y 30/00*** | (2011.01) |
| ***B82Y 40/00*** | (2011.01) |

(52) U.S. Cl.
CPC ............... *C01B 32/18* (2017.08); *B82Y 30/00* (2013.01); *B82Y 40/00* (2013.01); *C01P 2004/64* (2013.01)

(58) Field of Classification Search
CPC ..... C01B 32/18; C01B 32/158; C01B 32/159; C01B 32/16; C01B 32/162; C01B 32/164;
(Continued)

(56) References Cited

U.S. PATENT DOCUMENTS

| | | |
|---|---|---|
| 2007/0184190 A1 | 8/2007 | Hiramatsu et al. |
| 2008/0274392 A1 | 11/2008 | Hori et al. |

(Continued)

FOREIGN PATENT DOCUMENTS

| | | |
|---|---|---|
| CN | 102668180 A | 9/2012 |
| CN | 102668181 A | 9/2012 |

(Continued)

OTHER PUBLICATIONS

Database WPI, Week Jan. 2015, Thomson Scientific, London, GB; AN 2014-V49660, XP002789461, & JP 2014 225679 A (Univ Nagoya) Dec. 4, 2014, 2 pages.

(Continued)

*Primary Examiner* — Daniel C. McCracken
(74) *Attorney, Agent, or Firm* — Ziegler IP Law Group LLC

(57) ABSTRACT

The present disclosure relates to methods for depositing vertically oriented carbon nanowalls (CNWs) using non-equilibrium gases such as gaseous plasma. Methods are disclosed for rapid deposition of uniformly distributed nanowalls on large surfaces of substrates using ablation of bulk carbon materials by reactive gaseous species, formation of oxidized carbon-containing gaseous molecules, ionization of said molecules and interacting said molecules, neutral or positively charged, with a substrate. The CNWs
(Continued)

100 nm prepared are useful in different applications such as fuel cells, lithium ion batteries, photovoltaic devices and sensors of specific gaseous molecules.

15 Claims, 4 Drawing Sheets

(58) Field of Classification Search
CPC ..... C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; C01B 32/182; C01B 32/184; C01B 32/186; C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/23; B82Y 30/00; B82Y 40/00; C01P 2004/64; H01M 4/8673; H01M 4/625; H01M 4/9083; Y02E 60/10; Y02E 60/50; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

U.S. PATENT DOCUMENTS

| | | | | |
|---|---|---|---|---|
| 2009/0274610 | A1 | 11/2009 | Ghoanneviss et al. | |
| 2010/0212728 | A1 | 8/2010 | Hori et al. | |
| 2011/0033367 | A1 | 2/2011 | Riehl et al. | |
| 2011/0045207 | A1 * | 2/2011 | Hori | C01B 32/18 977/891 |
| 2012/0175515 | A1 | 7/2012 | Hori et al. | |
| 2014/0127411 | A1 | 5/2014 | Yoshimura et al. | |
| 2014/0170490 | A1 | 6/2014 | Izuhara et al. | |

FOREIGN PATENT DOCUMENTS

| | | | |
|---|---|---|---|
| CN | 103420354 | A | 12/2013 |
| CN | 103935975 | A | 7/2014 |
| CN | 103935982 | A | 7/2014 |
| CN | 103935983 | A | 7/2014 |
| EP | 1661855 | A1 | 5/2006 |
| JP | 2008063196 | A | 3/2008 |
| JP | 2008239369 | A | 10/2008 |
| JP | 2010009980 | A | 1/2010 |
| JP | 2015118348 | A | 6/2015 |
| KR | 20070099912 | A | 10/2007 |
| TW | 201448327 | A | 12/2014 |
| WO | 2016024301 | A1 | 2/2016 |
| WO | 2016059024 | A1 | 4/2016 |

OTHER PUBLICATIONS

Dikonimos et al."DC plasma enhanced growth of oriented carbon nanowall films by HFCVD" Diamond and Related Materials 16 (2007), Available online Jan. 2, 2007, www.elsevier.com/locate/diamond, doi: 10.1016/j.diamond.2006.11.073, 4 pages.

Itoh et al. "Preparation and electron field emission of carbon nanowall by Cat-CVD" Thin Solid Films 501 (2006), Available online Aug. 22, 2005, www.elsevier.com/locate/tsf, available online at www.sciencedirect.com, doi: 10.1016/j.tsf.2005.07.216, 4 pages.

Seiji et al. "Effect of hydrogen dilution in preparation of carbon nanowall by hot-wire CVD" Thin Solid Films 516 (2008), Available online Jul. 10, 2007 at www.sciencedirect.com, www.elesvier.com/locate/tsf, doi: 10.1016/j.tsf.2007.06.181, 4 pages.

Shiji et al. "Vertical growth of carbon nanowalls using rf plasma-enhanced chemical vapor deposition" Diamond & Related Materials 14 (2005), www.elsevier.com/locate/diamond, available online Dec. 8, 2004 at www.sciencedirect.com, doi: 10.101 6/j.diamond.2004.10.021, 4 pages.

Tanaka et al. "Growth of Carbon Nanowalls on a SiO2 Substrate by Microwave Plasma-Enhanced Chemical Vapor Deposition" The Japan Society of Applied Physics, Japanese Journal of Applied Physics vol. 44 No. 4A, published Apr. 8, 2005, 4 pages.

Urska Mrgole "Rapid deposition of carbon nanowalls (almost 1 μm/s) for fuel cells and batteries", Institute Josef Stefan, Ljublijana, Slovenijia, Jan. 4, 2019, XP002789462, Retrieved from the Internet: URL http://jro-ktt.si/wp-content/uploads/2019/01/KTT_Tehnoloska_ponudba_IJS-Rapid-deposition-of-carbon-nanowalls-almost-1-%CT%B5ms-for-fuel-cells-and-batteries.pdf, retrieved on Mar. 5, 2019, 2 pages.

Wu et al. "Carbon Nanowalls Grown by Microwave Plasma Enhanced Chemical Vapor Deposition", Advanced Materials 2002 14, No. 1, Jan. 14, 5 pages.

Yang et al. "Electrochemical Synthesis and Characterization of Magnetic Nanoparticles on Carbon Nanowall Templates" Nano Letters 2002 Vol. 2, No. 7, published on web May 21, 2002, 4 pages.

International Search Report, Application No. PCT/EP2018/065365, dated Mar. 20, 2019, 3 pages.

* cited by examiner

CARBON NANOSTRUCTURED MATERIALS AND METHODS FOR FORMING CARBON NANOSTRUCTURED MATERIALS

FIELD

The aspects of the disclosed embodiments relate to carbon nanostructured materials and to methods for forming carbon nanostructured materials. Of particular interest are carbon nanowall materials such as vertically oriented carbon nanowalls (CNWs). Such materials are of interest, for example, in applications such as fuel cells, rechargeable batteries such as lithium ion batteries, photovoltaic devices and sensors of target gaseous molecules.

BACKGROUND

"Carbon nanowall" (thereafter CNW) materials represent a group of carbon-containing structures that have a defined morphology. CNW materials typically have thickness up to about 100 nm, height between about 100 nm and 100,000 nm and extend substantially perpendicular from the surface of a substrate. They are usually formed in a dense array on the substrate and oriented randomly so that they often form a network. CNWs are predominantly composed of carbon but can contain other elements including hydrogen, fluorine, nitrogen, oxygen or metal atoms. The structure of CNWs may be rich in graphene sheets but may contain also other types of carbon. Such a structure allows for very large specific surface area, as compared to smooth carbon materials, but still benefits from superior electrical and chemical properties. CNWs are regarded as promising materials for application in devices where large specific surfaces of graphene-like materials are needed. The examples include fuel cells, lithium ion batteries, photovoltaic devices, thin-film transistors, sensors of specific gaseous molecules, field-emission devices, batteries, light absorbers, enhanced detectors for electrochemical and gas sensors, electric double layer capacitors and scaffolds for tissue engineering.

The first report on synthesis of CNW structures appeared in scientific literature in 2002 [Wu et al. (2002)]. They used an ultra-high vacuum system of ultimate pressure of $3\times10^{-9}$ torr. The gases used were methane and hydrogen of flow rates 40 and 10 sccm, respectively. Such a gas mixture is a natural choice for depositing any other carbon nanomaterials such as diamond, nanotubes and fullerenes because methane partially dissociates and ionizes upon plasma conditions. Consequently, the radicals such as C, CH, $CH_2$ and perhaps $CH_3$ stick to the substrate surface. A rather high substrate temperature of about 700° C. was used in order to favor decomposition of hydrogenated carbon to almost pure carbon, suitable for growing carbon structures almost free from hydrogen. Additional DC biasing was applied to deliver more energy to the substrates upon growing CNWs. A catalyst (typically NiFe) was applied in order to stimulate the growth. Addition of hydrogen was disclosed as being essential since the atomic hydrogen and positively charged molecular and atomic hydrogen cause removal of weaker-bonded carbon, what is beneficial for appropriate structure of the CNWs. Wu et al. (2002) found their CNWs suitable for application in batteries, light-emitting and conversion devices, catalysts, and other areas requiring high surface area materials. The same group also reported electrochemical synthesis of magnetic nanoparticles on CNW templates [Yang et al. (2002)].

In 2005, the group of M. Hori reported fabrication of two-dimensional carbon nanostructures (CNWs) by capacitively coupled, radio-frequency plasma-enhanced chemical vapor deposition employing fluorocarbon/hydrogen mixtures [Shiji et al. (2005)]. Correlation between CNW growth and fabrication conditions, such as the carbon source gases, was investigated. In addition, the influence of H atom density in the plasma was measured using vacuum ultraviolet absorption spectroscopy in order to discuss the growth mechanism of CNWs.

Also in 2005, Tanaka et al. (2005) reported growth of CNWs on a $SiO_2$ substrate by microwave plasma-enhanced chemical vapor deposition. They investigated the growth process and revealed that the CNWs were grown on the fine-textured structure of the $SiO_2$ and the growth process did not require a catalyst (as opposite to Wu et al (2002)). The CNWs initially had a semicircular shape. The height, thickness, and mesh size increased with growth time. It was found that the height of CNWs as a function of time obeyed the square root law. A rather high growth rate, approximately 10 micrometers per hour, was achieved. They also used hydrocarbons with hydrogen as a useful gas mixture.

In 2006, Itoh et al. (2006) reported preparation and electron field emission of CNWs by using a catalytic chemical vapor deposition technique. CNW films were prepared using only $CH_4$ gas. No hydrogen was added in the plasma. The CNW structures on substrates were observed at the substrate temperature around 500° C. On substrates heated to lower temperatures, the wall structure was not observed.

Dikonimos et al. (2007) reported CNWs with maximum longitudinal dimensions ranging from 10 to 200 nm and wall thickness lower than 5 nm. Such structures were grown on Si substrates in a high-frequency chemical vapor deposition reactor. The growth precursors consisted of methane diluted into noble gas (helium). The effect of a DC plasma on the growth rate and film morphology was explored. The experimental setup consisted of a two-grid system which enabled varying the plasma voltage and current density on the substrate surface independently. An increase of growth rate was observed as the film thickness increased from few nanometers to about 200 nm when the substrate current density was increased.

The importance of the hydrogen in the gas mixtures was elaborated in Shimabukuro et al. (2008). Unlike the work discussed above, Shimabukuro et al. (2008) employed a hot surface (wire) for partial dissociation of a methane-based precursor. $CH_4$ with different hydrogen dilution ratios was used for structure variation in the CNWs against hydrogen dilution. The wall height and width in the samples prepared with the hydrogen dilution ratio ($H_2/CH_4+H_2$) between 10% and 25% were larger than for samples prepared without hydrogen dilution.

US 2007/184190A1 discloses a method for producing CNWs and an apparatus suitable for carrying out the method. A source gas containing carbon is introduced into a reaction chamber with a parallel plate-type capacitive coupled plasma (CCP) generator. In a second radical-generating chamber, which is disposed outside the reaction chamber, hydrogen radicals are generated by decomposing radical source gas containing hydrogen using RF waves or other waves. The hydrogen radicals are introduced into the plasma atmosphere, whereby CNWs are deposited on a substrate disposed on the second electrode of the CCP. The growth of the CNW with this method is rather slow, about 1 μm high CNWs in approximately 5 hours. The disclosure in US 2007/184190A1 concentrates on the application of a remote source of atomic hydrogen that was deemed essential for the growth of high-quality CNWs. The present inventors consider that a drawback of the method disclosed in US 2007/184190A1 is the long treatment time.

JP 2008 063196A aims to suppress such a drawback, providing a production method and a production device for carbon nanostructures where base materials forming carbon nanostructures can be continuously fed, thus facilitating mass-production. The method described in JP 2008 063196A is based on US 2007/184190A1.

US 2011/045207A1 aims to improve the method disclosed in US 2007/184190A1 in order to improve the crystallinity of CNWs. Here they improved the growth rate to about 60 nm/min. However, further improvement of crystallinity reduces the growth rate to about 20 nm/min.

A method for growing CNWs on a base material is disclosed also in US 2009/274610A1. This method comprises:

- mixing a predetermined amount of a hydrocarbon gas with a predetermined amount of at least one non-hydrocarbon gas;
- placing said base material in a reaction chamber;
- creating a radical in reaction chamber which comprises a hydrocarbon radical and a non-hydrocarbon radical;
- applying the radical to the base material;
- growing CNWs on said base material based on said hydrocarbon radical.

In US 2009/274610A1, CNWs are created under atmospheric pressure, the CNW growth with this method typically taking in the order of tens of minutes.

CN 103420354A describes a two-step method for CNW preparation. The method disclosed in CN 103420354A includes etching a metal substrate with an acid solution having a concentration of 0.01-1 mol/L and chemical vapor deposition while heating the metal substrate in the reaction chamber to 700-1100° C. CNWs are grown in a time scale of hours.

CNWs are also formed as a by-product in a $CO_2$ reduction device and method disclosed in WO 2016/024301A1. This carbon dioxide reduction method produces CNWs as a by-product by transforming $CO_2$ gas into carbon source using microwave plasma chemical vapor deposition and using water vapor as carrier gas. The carbon dioxide reduction apparatus has a U-shaped reaction tube that is provided to an interior of an adjacent portion of a microwave guiding unit and is composed of a gas introduction tube and a gas exhaust tube. The microwave plasma is generated in the reaction tube, in particular at the bending part of the U-shaped reaction tube. In the preferred embodiment the sizes of the microwave waveguide in the carbon dioxide reduction apparatus of this present disclosure have length below 400 mm, width below 200 mm, and height below 100 mm in order to make the apparatus compact. The microwave plasma chemical vapor deposition method is used to reduce $CO_2$ gas in carbon oxide-containing gas flowing through the inside of the reaction tube. The water vapor gas is used as a carrier gas of the carbon oxide-containing gas. Unlike all previously cited documents, the methods disclosed in WO 2016/024301A1 do not rely on injection of hydrocarbons into the gaseous plasma. The $CO_2$ gas is immobilized and CNWs are produced on a base material positioned inside the gas exhaust tube. The pressure in the reaction tube is set between 100-200 Pa. When the pressure in a reaction tube is lower than 100 Pa, or when the pressure in a reaction tube is higher than 200 Pa, it becomes difficult to generate plasma by using microwaves. WO 2016/024301A1 therefore discloses a carbon dioxide reduction system which has a former stage carbon dioxide reduction apparatus whose gas exhaust tube is connected with gas introduction tube of latter carbon dioxide reduction apparatus; and a carbon dioxide reduction method which produces CNWs by making $CO_2$ gas into carbon source using microwave plasma CVD method and water vapor gas as carrier gas. The flow ratio of $CO_2$ gas and water vapor gas is from 3:7 to 5:5. In WO 2016/024301A1 the best results in terms of carbon dioxide decomposition are obtained at rather low total gas flow. At 100 sccm a typical decomposition rate is about 50% while at 500 sccm it is about 15%. The decomposition rate increases with increasing discharge power. The electric power generated by photovoltaic cells is used as input electrical power for generation of microwave plasma in one embodiment. In addition, the sediment deposited on a base material besides CNW also contains graphene.

US 2011/0033367A1 relates generally to process for the production of carbon nanostructures, and nanostructured films comprised of nanotubes and in a particular embodiment, solid carbon nanorods (SCNR). The growth of carbon nanorods, nanotubes and nanoclusters is obtained by oxidation/reduction process. A reactive gas ($H_2$, $N_2$, $NO_x$, CO, $CO_2$, $H_2O$, $Cl_2$, $F_2$) is leaked into a reaction chamber or may be produced in-situ, and reacted with a carbide (SiC, TiC, BaC, $Cr_3C_2$) while the by-products are removed. The carbon nanostructures grow on the surface of carbides upon heating to a high temperature, typically 1700° C. The methods of the present disclosure preferably employ a graphite reactor to withstand high temperatures. The pressure level is in the range 0.0001 to 5 Torr. The growth is typically accomplished on a time scale of about 1 hour. No discharge is applied so the process runs close to thermal equilibrium so without employing gaseous plasma. The carbon nanostructures grow on a material containing carbon, typically on silicon carbide or other type of carbide.

KR 200631291A discloses a method for synthesizing carbon nanotubes using a remote plasma source for ionization of reaction gas (either $C_xH_y$ or $C_xO_y$), spraying the activated reaction gas into the processing chamber and depositing the carbon nanotubes onto any suitable substrate including non-conductive substrates such as glass. The nanotubes grow with a help of the buffer layer or a metal catalyst layer. A DC power supply is connected to the upper part of the catalyst layer to deliver a negative potential to the surface of the substrate and thus help accelerating gaseous ions onto the surface of the substrate. KR 200631291A requires the formation of an electric field on the top of the substrate, which is beneficial for directivity of the carbon nanotube growth. The configuration enables growth in the remote plasma mode at low temperature. Moreover, the substrate damage including arcing can be reduced.

It is known that CNWs can be used for different purposes such as for fuel cells, lithium ion batteries, diodes and photovoltaic devices, etc.

In JP 2008 239369A a method for manufacturing a catalyst layer for a fuel cell is described. Here CNWs are refined in order to enhance the power generation efficiency of a fuel cell by improving the contact of hydrogen and oxygen molecules, which take part in a reaction, with a metal catalyst and an electrolyte in the fuel cell to sufficiently form a three-phase interface.

US 2008/274392A1 discloses a method that simplifies the process for manufacturing an electrode layer for fuel cells and improves the dispersibility of the catalyst component and the electrolyte, whereby the generation efficiency of a fuel cell can be improved.

CNWs are also useful as a negative electrode material for lithium batteries. In JP 2010 009980A the negative electrode material for a lithium ion battery is prepared by using flaky CNWs constituted of aggregates in which crystallites having 10 to 30 nm range are oriented. A thin lithium battery which uses the material is also provided.

CNWs for use as negative electrodes for lithium batteries are disclosed in JP 2010 009980A, CN 102668180A, US 2014/170490A1, TW 2014 48327A. CNWs for use as a positive electrode for lithium batteries are disclosed in CN 102668181A.

CNWs can also be used for diodes and photovoltaic devices. US 2010/212728A1 provides an electronic device employing a carbon nanostructure and exhibiting useful characteristics. A diode is presented, which has a pn junction between the n-conduction-type CNWs and the p-conduction-type CNWs.

CNWs can also be used as a part of a sample substrate for laser desorption ionization mass spectrometry (LDI-MS) as described in US 2012/175515A1. CNWs are used as a saturable absorbing element with a wide absorption band, a high light absorbance, and a high modulation depth (JP 2015 118348A). They can also be used in medical applications, while they can be grown on a substrate of an implantable medical device (WO 2016/059024A1). CNWs are also used as a raw material for producing other materials, such as graphene nanoribbons (CN 103935975A, CN 103935982A, CN 103935983A) or metal-supported nano-graphite (US 2014/127411A1).

The prior art can be summarized as follows:

- Either gaseous plasma or hot wires are used for production of reactive carbon-containing molecules that stick to the surface substrate and cause growing of CNW on said substrate;
- Said reactive carbon-containing molecules are produced from hydrogenated carbon precursors, sometimes fluorinated as in K. Shiji et al. (2005), or from a mixture of carbon dioxide and water vapor as in WO 2016/024301A1; Precursors are essentially gaseous and are continuously leaked into a reaction chamber to facilitate growing of CNWs. The gases are continuously removed from the reaction chamber;
- Hydrogen is leaked into the reaction chamber simultaneously with hydrogenated carbon precursors in order to obtain high quality of nanowalls. Noble gases are sometimes added into the gas mixture leaked into the reaction chamber. In WO 2016/024301A1, where carbon dioxide is the source of said reactive carbon-containing molecules, water vapor serves as a replacement of hydrogen;
- Metallic catalysts were applied in early documents but have more recently been omitted;
- No solid material as the source of said reactive carbon-containing molecules has been reported;
- No $C_xO_y$ gaseous molecules are reported as precursors except for growing carbon nanotubes and nanorods in US 2011/0033367A1 at the absence of plasma, and in KR 200631291A using a remote plasma source with DC biasing of the substrate which is covered with a catalyst film before depositing carbon nanotubes;
- Elevated temperatures of the substrates are applied upon growing of CNWs. In some documents, the temperatures ranging from about 500 to 1700° C. are reported, but in many documents the exact temperatures of the substrates are not reported.

All above documented methods for CNW deposition suffer from rather low deposition rates and are mostly improper for industrial scale-up.

SUMMARY

The aspects of the disclosed embodiments have been devised in light of the above considerations.

In a general aspect, the present disclosure proposes the deposition of CNWs on a substrate using a CO cycle. The CO cycle is discussed in more detail below.

In a first preferred aspect, the present disclosure provides a method for depositing a layer of CNWs on a substrate using a CO cycle, the method comprising: providing a carbon-containing precursor material in condensed form in the reaction chamber;

providing an oxygen-containing atmosphere in the reaction chamber;

forming a plasma discharge in the oxygen-containing atmosphere in the reaction chamber; wherein CO molecules in the plasma discharge interact with the carbon-containing precursor material to form $C_xO_y$ molecules, the $C_xO_y$ molecules diffusing to the substrate and decomposing at the substrate to form CO molecules and carbon, the carbon building up CNWs.

In a second preferred aspect, the present disclosure provides a method for synthesizing $C_xO_y$ gaseous molecules, the method comprising:

providing a carbon-containing precursor material in condensed form in a reaction chamber;

providing an oxygen-containing atmosphere in the reaction chamber;

forming a plasma discharge in the oxygen-containing atmosphere in the reaction chamber;

wherein CO molecules in the plasma discharge interact with the carbon-containing precursor material to form $C_xO_y$ molecules.

In a third preferred aspect, the present disclosure provides a method for depositing a layer of CNWs on a substrate, the method comprising:

providing an atmosphere containing $C_xO_y$ molecules in a reaction chamber, optionally according to the second aspect of the present disclosure;

providing a substrate in the reaction chamber;

forming a plasma discharge in the atmosphere containing $CO_xO_y$ molecules in the reaction chamber;

wherein $C_xO_y$ molecules diffuse to the substrate and decompose at the substrate to form CO molecules and carbon, the carbon building up CNWs.

In a fourth preferred aspect, the present disclosure provides a CNW material obtained by or obtainable by a method according to the first, second or third aspect.

In a fifth preferred aspect, the present disclosure provides a use of a CNW material of the fourth aspect in a fuel cell or in a photovoltaic device.

Further optional features of the disclosure are now set out, and may be combined with any suitable aspect of the disclosed embodiments.

The CO molecules formed at the substrate by decomposition of the $CO_xO_y$ molecules may subsequently diffuse to the carbon-containing precursor material to form further $C_xO_y$ molecules.

At least some of the $CO_xO_y$ gaseous molecules may be charged, thereby being accelerated in a sheath between the plasma and the substrate before interacting with the substrate, thereby promoting the formation of CNWs.

Considering the $C_xO_y$ gaseous molecules, x>y may apply. In some embodiments, x≥2. In some embodiments, y≥1.

The substrate may be heated to a temperature in the range 100-1500° C. For example, the substrate may be heated to a temperature of at least 400° C., or at least 700° C. The substrate may be heated to a temperature of at most 1200° C., or at most 1000° C.

The carbon-containing precursor material may be heated to a temperature greater than 100° C. For example, the carbon-containing precursor material may be heated to a temperature greater than 300° C.

The pressure in reaction chamber during deposition of CNWs may be between 1 and 100 Pa.

The oxygen-containing atmosphere in the reaction chamber may be substantially free of hydrogen-containing gas, such as hydrocarbons, water, hydrogen.

Using the aspects of the present disclosure, it is possible to obtain a growth rate of the CNWs of more than 1 nm/sec, such as at least 10 nm/sec, preferably about 100 nm/s.

Still more optional features of the present disclosure and further technical explanations of preferred embodiments of the present disclosure are set out below.

In the reaction chamber, at least one piece of solid carbon-containing precursor material may be mounted. The reaction chamber may be filled with any suitable oxygen-containing gas to a preferable density of about $10^{22}$ $m^{-3}$. The gaseous plasma may be created by any suitable discharge.

Said oxygen-containing gas may be selected from the list of gases including but not limited to oxygen, carbon monoxide, carbon dioxide, and oxygen-containing organic gaseous molecules. Said oxygen-containing gas may not be leaked and pumped continuously as in prior disclosures but here typically only acts as a medium for transferring carbon from said solid carbon-containing precursor material to the substrate. The CNWs then grow on the said substrate. Upon ignition of said gaseous discharge, said oxygen-containing gas dissociates to oxygen atoms that interact with said solid carbon-containing material forming CO radicals. Said CO radicals are partially ionized upon plasma conditions. Said CO radicals, neutral or ionized, interact with said solid carbon-containing material forming $CO_xO_y$ gaseous molecules. The value of y in $C_xO_y$ gaseous molecules is typically 1 or 2. Said $CO_xO_y$ gaseous molecules are partially ionized upon plasma conditions and diffuse in the reaction chamber until they interact with said substrate. The said substrate may be heated to elevated temperature. The interaction between said heated substrate and said $CO_xO_y$ gaseous molecules, neutral or ionized, causes decomposition of said $C_xO_y$ gaseous molecules: the carbon builds CNWs and releases CO radicals. The CO radicals desorb from the said heated substrate, enter the gas phase, partially ionize, diffuse in the reaction chamber and eventually reach said carbon-containing material. Said CO radicals interact with said carbon-containing material forming $C_xO_y$ gaseous molecules. Said $CO_xO_y$ gaseous molecules partially ionize upon plasma conditions, diffuse, and eventually decompose on the heated substrate thus representing a supply of carbon for building more CNWs on the said heated substrate. The procedure described above is referred to herein as the “CO cycle”. The CO cycle keeps running as long as the discharge is on.

The CO radicals typically ablate said carbon-containing material to form said $C_xO_y$ gaseous molecules, which decompose on the substrate, release CO that further ablates said carbon-containing material and consequently form more said $CO_xO_y$ gaseous molecules, etc. Preferably, said CO cycle causes uniform growth of CNWs on the substrate. The size or shape of the substrate does not influence significantly the growing of CNWs, providing enough supply of said $C_xO_y$ gaseous molecules is assured. The growth rate of CNWs using embodiments of the present disclosure depends on the concentration of the CO radicals inside the reaction chamber, and the temperatures of both said carbon-containing material and said heated substrate. Plasma conditions are considered to be important for sustenance of the CO cycle. In the preferred embodiments, the growth rate is about 100 nanometers per second. This is superior to prior art methods. Preferably, the CNWs grown by the methods of the present disclosure do not contain measurable amounts of any atom except carbon.

In the preferred embodiments, all surfaces facing plasma, created by said gaseous discharge in the reaction chamber, are kept at temperatures substantially below the temperature of the said heated substrate and/or the carbon-containing precursor material. In further preferred embodiments, the temperature of the all such surfaces facing plasma created by said gaseous discharge in the reaction chamber is kept below 100° C.

The temperature of the heated substrate may be between 300 and 1500° C. Lower temperatures of said heated substrate suppress decomposition of said $C_xO_y$ gaseous molecules, while higher temperatures of said heated substrate cause growth of morphological and/or structural carbon materials other than CNWs. In further preferred embodiments, the temperature of said heated substrate is between 700 and 1000° C.

Preferably, the temperature of said carbon-containing material is between 0 and 2000° C., preferably between 200 and 1500° C., most preferred from 500 to 1000° C. The temperature influences both the ablation rate and the structure/composition of said $CO_xO_y$ gaseous molecules.

Preferably, said carbon-containing precursor material is graphite in any form, more preferably in the form of pyrolytic graphite including highly oriented pyrolytic graphite. In another embodiment, the said carbon-containing material is a polymer of any type.

In a preferred embodiment, the method is comprised of following steps:

i. positioning said carbon-containing precursor material and said heated substrate into reaction chamber;
ii. evacuating gas from said treatment chamber, thereby reducing the pressure in said treatment chamber;
iii. introducing said oxygen-containing gas into the evacuated reaction chamber;
iv. applying an electrical discharge to form gaseous plasma in the reaction chamber;
v. leaving said CO cycle running until the desired thickness of the CNW is achieved;
vi. optionally, heating either the said heated substrate or said carbon-containing precursor material or both by external heat source other than plasma, like resistive heating, induction heating or heating by irradiation with photons, electrons or ions;
vii. cooling both said heated substrate and said carbon-containing precursor material until the temperature drops below about 300° C.;
viii. venting said treatment chamber, thereby increasing the pressure inside the treatment chamber to ambient pressure.

It shall be understood that the oxygen-containing gas is present in the reaction chamber upon application of the electrical discharge in steps v. and vi.

Other aspects of the disclosed embodiments relate to the production of CNW coatings, said method comprising providing a heated substrate, modifying said heated substrate by a method of the present disclosure as described above, thereby obtaining the CNW coating having desired properties.

Another aspect of the present disclosure further relates to the use of said CO cycle for the deposition of the CNW coatings, wherein said deposition is substantially achieved as in the methods described above.

Another aspect of the disclosed embodiments relate to a product comprising a CNW coating deposited by the methods of the present disclosure. Such products have very high surface to mass ratio, increased hydrophobicity and/or high emissivity in the visible range of wavelengths, according to the present disclosure.

Another aspect of the disclosed embodiments relate to the use of a CNW material of the present disclosure in fuel cells.

A further aspect of the disclosed embodiments relate to the use of materials or products of the present disclosure for fuel cells and/or photovoltaic devices.

Preferred products are fuel cells, lithium ion batteries, photovoltaic devices, thin-film transistors, sensors of specific gaseous molecules, field-emission devices, light absorbers, enhanced detectors for electrochemical and gas sensors, electric double layer capacitors, scaffolds for tissue engineering and body implants.

Other aspects of the disclosed embodiments relate to the production of $CO_xO_y$ gaseous molecules, said method comprising:

- providing a vacuum chamber;
- placing at least one piece of carbon-containing precursor material into said vacuum chamber;
- evacuating said vacuum chamber;
- filling said vacuum chamber with oxygen-containing gas;
- igniting gaseous plasma in said vacuum chamber filled with said oxygen-containing gas, allowing interaction between said oxygen-containing gas in plasma condition and said carbon-containing precursor material;
- sustaining gaseous plasma until said oxygen-containing gas is at least partially transformed to said $C_xO_y$ gaseous molecules.

Other aspects of the disclosed embodiments relate to the production of CNWs from $C_xO_y$ gaseous molecules in plasma conditions. This aspect relates to production of CNWs on a heated substrate, said method comprising:

- providing a vacuum chamber;
- placing at least one piece of said heated substrate into said vacuum chamber;
- evacuating said vacuum chamber;
- filling said vacuum chamber with gas containing $C_xO_y$ gaseous molecules;
- igniting gaseous plasma in said vacuum chamber filled with said gas containing $CO_xO_y$ gaseous molecules, allowing interaction between said gas containing $C_xO_y$ gaseous molecules in plasma conditions and said heated substrate;
- sustaining gaseous plasma until said gas containing $CO_xO_y$ gaseous molecules is at least partially transformed to said CNWs.

Accordingly, in general terms there are provided methods for depositing vertically oriented carbon nanowalls (CNWs) using non-equilibrium gases such as gaseous plasma. Rapid deposition of uniformly distributed nanowalls is shown to be possible and this can be performed on large surfaces of any suitable substrates using ablation of bulk carbon materials by reactive gaseous species, formation of oxidized carbon-containing gaseous molecules, ionization of said molecules and interacting said molecules, neutral or positively charged, with the substrate. The CNWs prepared by the methods of the present disclosure are useful in different applications such as fuel cells, lithium ion batteries, photovoltaic devices and sensors of specific gaseous molecules.

The present disclosure includes the combination of the aspects and preferred features described except where such a combination is clearly impermissible or expressly avoided.

SUMMARY OF THE FIGURES

Embodiments and experiments illustrating the principles of the present disclosure will now be discussed with reference to the accompanying figures in which.

Figure 1:
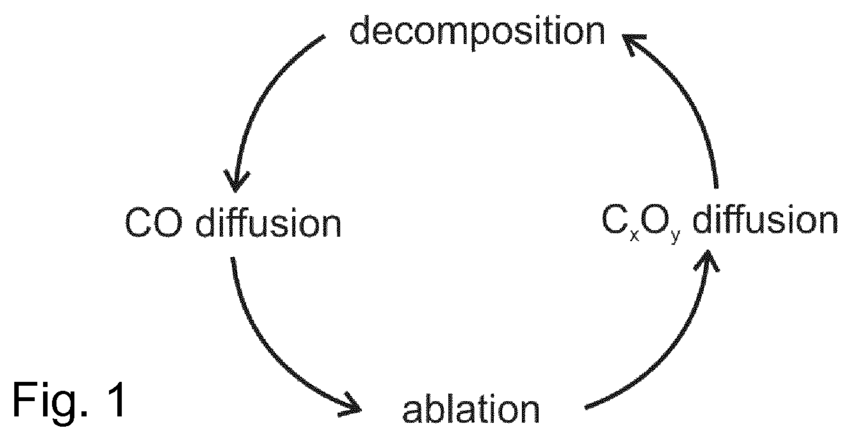
FIG. 1 shows a schematic of the CO cycle. The CO molecules diffuse in the gas phase until they reach the surface of a carbon-containing material. The CO molecules interact with the carbon-containing material causing formation of volatile $C_xO_y$ molecules. The $C_xO_y$ gaseous molecules formed on the surface of carbon-containing material diffuse in the gas phase until they reach the surface of the heated substrate. The $C_xO_y$ gaseous molecules interact with the heated substrate. The $C_xO_y$ gaseous molecules decompose on the heated substrate causing growth of the CNWs and formation of CO molecules. The CO molecules released from the heated substrate diffuse in the gas phase until they reach the surface of a carbon-containing material. It is considered that both CO and $CO_xO_y$ molecules are partially ionized.

The reference numerals used in the drawings are as follows:

1 CO molecule (neutral or ionized)
2 Carbon-containing material
3 The surface of the carbon-containing material
4 $CO_xO_y$ gaseous molecule (neutral or ionized)
5 Diffusion path of $C_xO_y$
6 The surface of the heated substrate
7 Heated substrate
8 Diffusion path of CO
9 Reaction chamber
10 Two-stage rotary vacuum pump
11 Gate valve
12 High-pressure container with oxygen-containing gas
13 Leak valve
14 Radio-frequency generator
15 Antenna
16 Graphite block
17 Sample
18 Duct used for pumping the reaction chamber
19 Duct used for leaking the oxygen-containing gas into the reaction chamber
20 Duct used for placing a holder with carbon-containing material into the reaction chamber
21 Holder with carbon-containing material
22 Duct used for placing the holder with substrate into the reaction chamber
23 Holder with substrate

DETAILED DESCRIPTION

Aspects and embodiments of the present disclosure will now be discussed with reference to the accompanying figures. Further aspects and embodiments will be apparent to those skilled in the art. All documents mentioned in this text are incorporated herein by reference.

The present disclosure relates to methods of depositing CNWs by contacting a substrate with $C_xO_y$ gaseous molecules. In preferred embodiments of the present disclosure, the source of said $C_xO_y$ gaseous molecules is a carbon-containing precursor material. Said carbon-containing precursor material is left to interact with CO molecules (neutral or ionized), that arrive to its surface from the gas phase. The interaction of said CO molecules with said carbon-containing precursor material causes formation of said $CO_xO_y$ gaseous molecules. The $CO_xO_y$ gaseous molecules desorb from the surface of the said carbon-containing precursor material, enter the gas phase and diffuse in the gas phase until they reach the substrate. When the said substrate is heated to elevated temperature the said $CO_xO_y$ gaseous molecules (neutral or ionized), decompose to carbon atoms or carbon clusters and CO molecules on the surface of said substrate. The C atoms or clusters build CNWs on the surface of said substrate while the CO molecules desorb from the surface of said substrate, enter the gas phase, diffuse in the gas phase and eventually reach the surface of said carbon-containing precursor material. The carbon-containing precursor material is left to interact with said CO molecules that arrive to its surface from the gas phase. The interaction of said CO molecules with said carbon-containing material causes formation of said $CO_xO_y$ gaseous molecules. This process shall be called the "CO cycle". In the CO cycle said CO molecules serve as a medium for ablation of said carbon-containing material to form said $CO_xO_y$ gaseous molecules. The $CO_xO_y$ gaseous molecules serve as building material for growth of CNWs. The growth of CNWs is a consequence of decomposition of said $CO_xO_y$ gaseous molecules on the surface of said substrate.

"CO cycle", within the context of the present disclosure, shall be understood as a procedure that involves:

- interaction of CO molecules with a carbon-containing precursor material, preferably graphite;
- said interaction leading to formation of $CO_xO_y$ gaseous molecules;
- said $C_xO_y$ gaseous molecules diffusing in the gas phase until they reach and interact with a substrate;
- said interaction between said $CO_xO_y$ gaseous molecules and said substrate causing decomposition of said $C_xO_y$ gaseous molecules;
- said thermal decomposition of said $CO_xO_y$ gaseous molecules leading to growth of CNWs on the surface of said substrate;
- said thermal decomposition of said $CO_xO_y$ gaseous molecules also leading to formation of CO molecules on the surface of said substrate.

Figure 2:
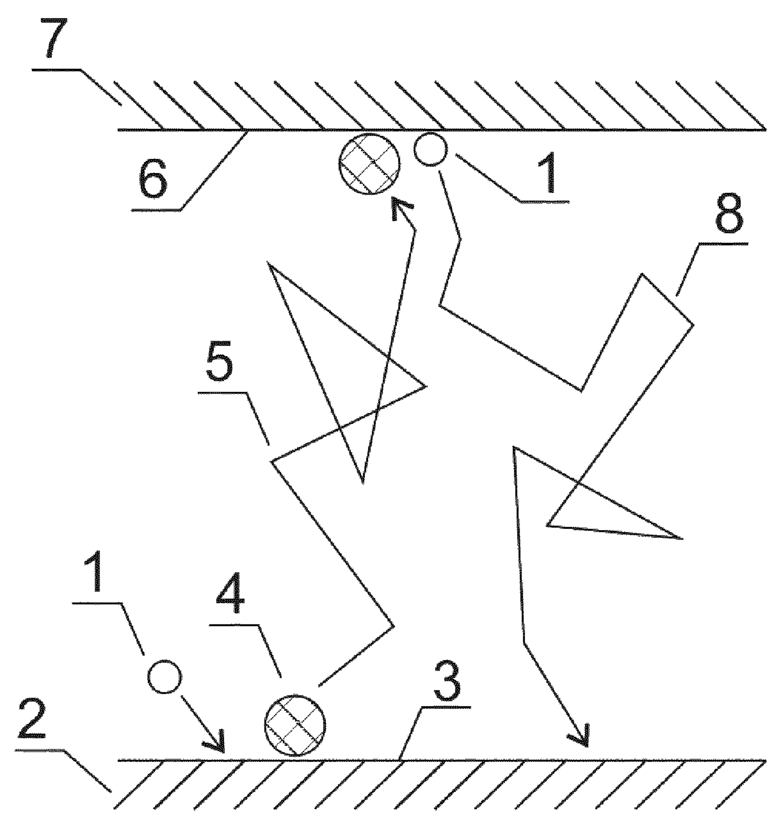
FIG. 2 shows a further schematic of the CO cycle. A CO molecule 1 (neutral or ionized) interacts with a carbon-containing precursor material 2 and on the surface 3 of the carbon-containing precursor material 2 causes formation of a $CO_xO_y$ gaseous molecule 4. The $C_xO_y$ gaseous molecule follows diffusion path 5 and eventually reaches the surface 6 of the heated substrate 7. The $CO_xO_y$ gaseous molecule 4 decomposes on the surface 6 of the heated substrate and releases one or more CO molecules 1. The CO molecule 1 follows its diffusion path 8 and eventually interacts with the surface 3 of the carbon-containing precursor material 2 to form a $CO_xO_y$ gaseous molecule.

The "CO cycle", within the context of the present disclosure, is schematically presented in FIGS. 1 and 2.

"Carbon-containing precursor material", within the context of the present disclosure, shall be understood as any condensed material (e.g. solid or liquid material) containing carbon atoms. "Carbon-containing precursor material" may for example be pure (or substantially pure) carbon in any form including but not limited to graphite, highly oriented pyrolytic graphite, soot, CNWs, fullerenes, carbon black; or any type of polymer including fluorinated, nitrated and oxidized polymers; or any type of hydrocarbons including those in liquid state at room temperature such as ketones, alcohols, lipids and the like.

"$C_xO_y$ gaseous molecules", within the context of the present disclosure, may be any molecule that contains at least two carbon atoms (i.e. $x \geq 2$) and at least one oxygen atom (i.e. $y \geq 1$), the number of carbon atoms being larger than the number of oxygen atoms (i.e. $x>y$). "$C_xO_y$ gaseous molecules" should preferably have suitable stability at room temperature and suitable instability at elevated temperature. The list of "$CO_xO_y$ gaseous molecules", within the context of the present disclosure, includes but is not limited to molecules such as $C_xO$ where x is any integer from 2 to about 1000 including $C_4O$, $C_6O$, $C_7O$; $C_xO_2$, where x is any integer from 3 to about 1000, etc.

"Substrate", within the context of the present disclosure, may be any solid material including metals and alloys, semi-conductors, metal oxides, nitrides and carbides including ceramics and glasses, polymers and other forms of carbon-based materials.

"CNW" materials, within the context of the present disclosure, shall be understood as carbon-containing structures that have the thickness up to about 100 nm, height between about 100 nm and 100,000 nm and extend from the surface of a substrate. CNW materials, within the context of the present disclosure, shall be understood also as dense structures of thickness up to about 100 nm oriented randomly on a substrate forming a network. CNW materials, within the context of the present disclosure, shall be understood to be composed predominantly of carbon but may also contain other elements including hydrogen, fluorine, nitrogen, oxygen or metal atoms. The structure of CNW, within the context of the present disclosure, shall be understood rich in graphene sheets but may contain also other types of carbon. Such a structure allows for a very large surface as compared to smooth carbon materials but still benefits from superior electrical and chemical properties of graphene.

In preferred embodiments, the CNWs are synthesized using the CO cycle. It is found that, using this approach, rapid synthesis of CNWs is possible on a wide range of solid substrates and the growth rate is superior to synthesis procedures known to the present inventors at the time of writing.

CNW materials are promising for mass application in cases where graphene properties are favorable and large surface-to-mass ratios are required. The known techniques, briefly presented above, suffer from low deposition rates—typically of the order of 1 nm/s. The low deposition rates of current techniques are due to the synthesis procedure which is based on the deposition of carbon from $CH_x$ radicals. The radicals are formed either in gaseous plasma or using hot wires. The pressure inside the processing chamber limits the density of $CH_x$ radicals in plasma: if the pressure is too high, gas phase agglomeration of $CH_x$ radicals occurs and the resultant $C_xH_y$ clusters that adsorb on the substrate surface do not allow for formation of CNWs but rather a thin film of hydrogenated carbon. Another drawback of current techniques is a need for continuous supply of carbon-containing materials (in most techniques hydrocarbons) upon growth of CNWs. Yet another drawback of current techniques is the need for hydrogen, which, in atomic form, serves for enhancing the quality of deposited CNWs. The present disclosure addresses these shortcomings of current techniques by substantially increasing the growth rate without losing the superior graphene-like structure of the CNWs. The growth rate is enhanced using $CO_xO_y$ gaseous molecules as the carbon source and the synthesis procedure is highly controllable, without the need to provide a continuous supply of precursors into the reaction chamber. Furthermore, no hydrogen is used in the methods of the present disclosure.

In the methods of the present disclosure, $C_xO_y$ gaseous molecules are applied as a building material for CNWs. The $C_xO_y$ gaseous molecules are rarely referred to in literature. The commonly known gaseous molecules containing only C and O are carbon monoxide (CO), carbon dioxide ($CO_2$), tricarbon dioxide ($C_3O_2$) and pentacarbon dioxide ($C_5O_2$). These molecules are gaseous at room temperature but inherently unstable when the number of carbon atoms is more than 3. Graphene oxides are another type of $C_xO_y$ gaseous molecules. They may contain several hexagonal carbon rings terminated by oxygen atoms (often epoxy bond) or OH radicals. The graphene oxides are solid and rather stable at room temperature. Under non-equilibrium conditions and upon interacting oxygen with a carbon-containing material a variety of $CO_xO_y$ gaseous molecules are created.

Many $C_xO_y$ gaseous molecules are unstable and decompose spontaneously. The decomposition rate depends on the temperature. As a general rule, the decomposition rate increases with increasing temperature. Many $C_xO_y$ gaseous molecules will decompose slowly at room temperature but very fast at elevated temperatures. The preferred embodiments of the present disclosure take advantage of the temperature dependence of the decomposition rate of $CO_xO_y$ gaseous molecules. In preferred embodiments, the entire reaction chamber is kept at room or only slightly above room temperature in order to prevent substantial loss of $CO_xO_y$ gaseous molecules by thermal decomposition at the walls of the reaction chamber or at other parts of the reaction chamber. The substrate, however, is preferably kept at higher temperature in order to facilitate rapid thermal decomposition of $CO_xO_y$ gaseous molecules on its surface.

Thermal decomposition of carbon-containing gaseous molecules by itself does not necessarily assure the required CNW arrangement of carbon atoms on a substrate surface. As will be understood, carbon usually grows in many other forms than CNWs. The CNWs are considered to grow preferentially due to simultaneous interaction of positively charged $C_xO_y$ gaseous molecules with the substrate. The positively charged ions are accelerated in the sheath between gaseous plasma and the substrate and gain energy of the order of 10 eV just before interacting with the substrate. This energy is beneficial since it allows for proper arrangement of carbon atoms on the substrate; said carbon atoms arrange in the form of CNWs.

The method may include the step of ablation of the carbon-containing precursor material placed in the reaction chamber. The ablation rate of carbon-containing precursor material depends on the temperature of the material. In a preferred embodiment the carbon-containing precursor material is heated to a rather high temperature in order to assure for rapid ablation of carbon-containing precursor material. The carbon-containing precursor material, in the preferred embodiments, is ablated by reactive plasma species, in particular by interaction of CO molecules with said carbon-containing precursor material. The CO molecules can be neutral or positively charged. The neutral CO molecules in gaseous plasma become vibrationally excited, thereby increasing the ablation rate of the carbon-containing material. The ablation of the carbon-containing material, in accordance with the preferred embodiments, results in the formation of $CO_xO_y$ gaseous molecules on the surface of said carbon-containing material, said $CO_xO_y$ gaseous molecules desorb from the surface of said carbon-containing material.

Another parameter that is considered to have an impact on the CO cycle according to the present disclosure is the gas purity. Without wishing to be bound by theory, it is assumed that gases other than oxygen-containing, if present, would likewise react with the carbon-containing precursor material, e.g. at its surface, upon exposure to oxygen-containing gas. Therefore, in the preferred embodiments, the oxygen-containing gas is in contact with the carbon-containing material at a relatively high level of purity, e.g. at 90%, 95%, 99% or 99.9% molar concentration of the oxygen-containing gas in the reaction gas. For this purpose, the treatment chamber is first evacuated to a relatively low pressure in order to remove other gases from the reaction chamber, and only then the oxygen-containing gas is added to the chamber. A treatment chamber is thus first evacuated by an appropriate vacuum pump. The pressure in the processing chamber after evacuation is preferably equal to or below 10 Pa, even more preferred equal to or below 1 Pa. After a successful evacuation, the treatment chamber is filled with the oxygen-containing gas to a (higher) pressure of e.g., 1,000 Pa, or 100 Pa, or 10 Pa. This is lower than atmospheric pressure. Such a moderate pressure was found advantageous in terms of the affinity between oxygen-containing gas and carbon-containing material. The use of a vacuum chamber is therefore advantageous for assuring high purity of oxygen-containing gas, and for assuring appropriate pressure in order to make suitable use of the CO cycle.

The optimal duration of processing depends on the treatment parameters, such as the temperatures of both carbon-containing material and the substrate, plasma parameters (which in turn depend on discharge parameters) and the pressure of oxygen-containing gas.

The CNW deposition rate increases with increasing temperature of carbon-containing precursor material. At a carbon-containing precursor material temperature of about 300° C. a satisfactory ablation rate can be achieved. Further increase of the carbon-containing precursor material's temperature results in higher ablation rates.

Higher ablation rates in turn cause an increase of the CNW deposition rate. In one experiment, the temperature of carbon-containing material was about 800° C., and deposition rates of about 100 nm/s were achieved.

The temperature of the substrate plays a role. The deposition rate of CNWs on the substrate is found to be low when the substrate's temperature is about 100° C. and increases with increasing temperature. At a substrate temperature of about 400° C., a higher CNW deposition rate can be achieved. A further increase of the substrate temperature results in increasing CNW deposition rate. In one experiment, the temperature of the substrate was about 1000° C., and deposition rates of about 100 nm/s were achieved.

In the preferred embodiments, the pressure of oxygen-containing gas is between 1 and 100 Pa. Operating in this range allows for reliable ignition and sustenance of plasma in the reaction chamber by various electrical discharges. In preferred embodiments plasma is sustained by a high-frequency electrodeless discharge. A suitable frequency is between 0.1 MHz and 10 GHz. Such electrodeless coupling is beneficial since the sputtering of material facing plasma is suppressed. Preferably, a discharge is powered by a standard high frequency generator operating at radio frequency (13.56, 27.12 MHz, or any other harmonic of 13.56 MHz) or microwave frequency (e.g. 2.45 GHz). The power of the discharge generator should be high enough to sustain gaseous plasma in the processing chamber. The suitable range of generator power depends on the volume of the reaction chamber and the pressure of the oxygen-containing gas. Typically, a larger volume and higher pressure will require a higher discharge power. In one experiment, the pressure of oxygen-containing gas was 30 Pa, the volume of dense plasma was about 1 liter and the discharge power was 800 W.

Preferably, the contact time of the heated substrate with the $CO_xO_y$ gaseous molecules is between 0.1 s and 1000 s. In further preferred embodiments the treatment time is between 1 s and 100 s. This preferred treatment time allows for optimal CNW deposition efficiency at the preferred pressure and the preferred temperature of carbon-containing material and the preferred temperature of substrate, according to the present disclosure. Preferably, the temperature of the substrate during treatment is between 700 and 1000° C. At lower temperature, the treatment time needed for optimal CNW deposition becomes too large, while at higher temperature the CNW may become degraded so that desired properties of the CNWs may be lost. This is particularly true at temperatures above about 1500° C., or even 2000° C. where deposition of carbon in other morphological or structural forms is observed.

The following treatment parameters have shown to be particularly advantageous: pressure of 30 Pa, discharge power of 800 W, generator frequency of 13.56 MHz, the temperature of the carbon-containing precursor material 800° C., substrate temperature 1000° C. and the volume of intense gaseous plasma 1 liter.

Some preferred embodiments of the present disclosure shall now be described with reference to the following non-limiting examples.

Example 1

CNWs were deposited onto titanium substrate according to the process schematically presented in FIGS. 1 and 2. The pressure upon contacting the (titanium) substrate heated to about 1000° C. with the oxygen-containing gas (in this case, pure carbon dioxide) was 30 Pa, the frequency of the discharge generator was 13.56 MHz and the temperature of the carbon-containing material was 800° C. The treatment time was 20 s.

Figures 3, 4:
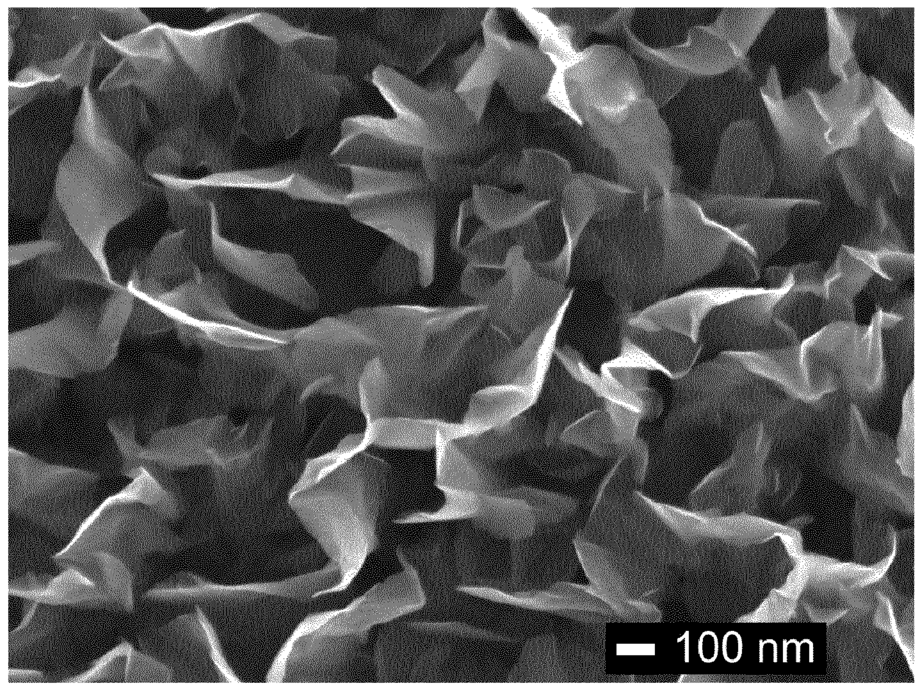
FIG. 3 shows an SEM image of CNWs deposited on a heated substrate using an embodiment of the present disclosure.
FIG. 4 shows an image of a water droplet on the surface of CNWs deposited on a heated substrate using an embodiment of the present disclosure.

The CNW deposited on the titanium substrate was imaged with a scanning electron microscope (SEM). FIG. 3 represents an SEM image of a typical product. The deposited CNW coating has a super-hydrophobic character. An image of a water drop on the surface of the CNW coating is presented in FIG. 4.

Figure 5:
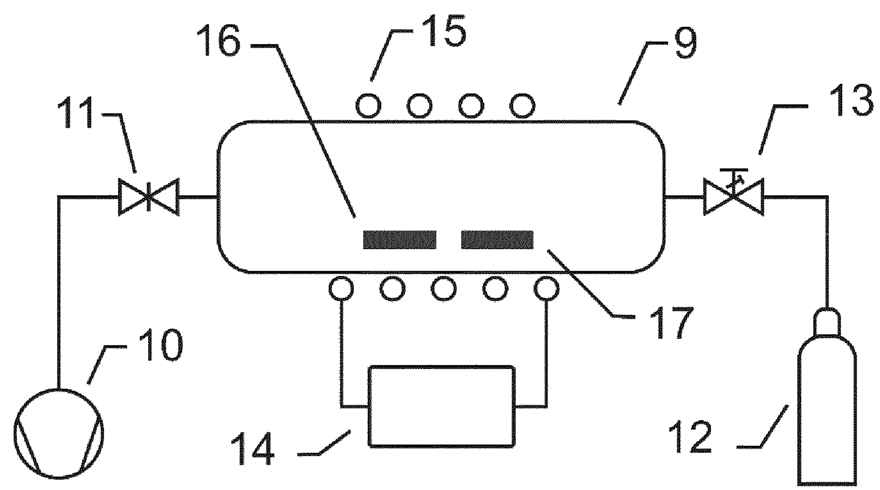
FIG. 5 shows a schematic of the setup suitable for growing CNWs according to Example 1.

The experimental set up for this example is shown schematically in FIG. 5. The reaction chamber 9 is made from borosilicate glass and is equipped with a two-stage rotary vacuum pump 10. There is a gate valve 11 for separating the vacuum pump 10 from the reaction chamber 9. The oxygen-containing gas was carbon dioxide stored in a high-pressure container 12 separated from the reaction chamber 9 with a leak valve 13. Gaseous plasma is generated in the reaction chamber by a radio-frequency generator 14 operating at the frequency of 13.56 MHz and with the output power of 800 W. The generator is coupled with gaseous plasma via an antenna 15. Carbon-containing precursor material, a piece of graphite 16 in this case, and the sample 17 were placed in the same reaction chamber 9, adjacent each other.

The reaction chamber 9 was first evacuated to a pressure below 1 Pa by the vacuum pump 10. Then, the pump was separated from the reaction chamber 9 by closing the gate valve 11. Carbon dioxide from the high-pressure container 12 was leaked into the evacuated reaction chamber 9 using the leak valve 13 until a pressure of 30 Pa was reached in the reaction chamber 9. When the pressure of 30 Pa was reached, the leak valve was closed. Then, plasma was created inside the reaction chamber 9 using the RF generator 14. Both the graphite block 16 and the sample 17 were heated inside the reaction chamber 9 due to power dissipated into plasma by the RF generator 14 so no external heating was applied in this Example 1. The density of positively charged ions was of the order of $10^{18}$ $m^{-3}$.

Figure 6:
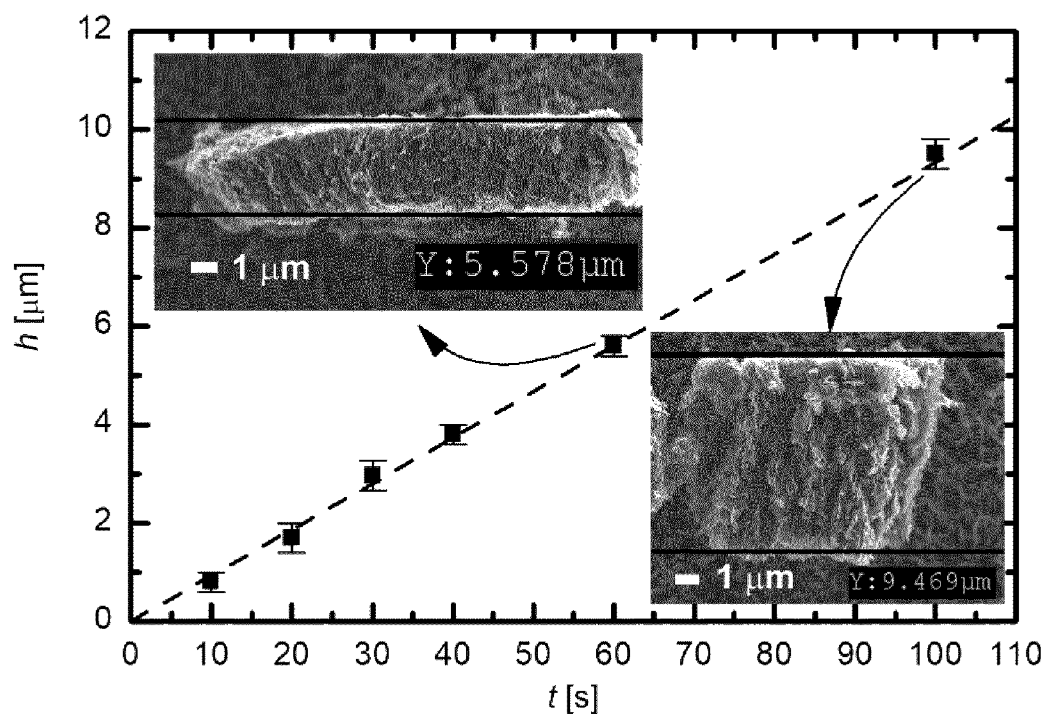
FIG. 6 shows the thickness of the CNWs versus treatment time according to Example 1.

The treatment time in this example was varied and the thickness of the CNWs was measured for each treatment time. The thickness of the CNWs versus the treatment time is shown in FIG. 6.

Example 2

Figure 7:
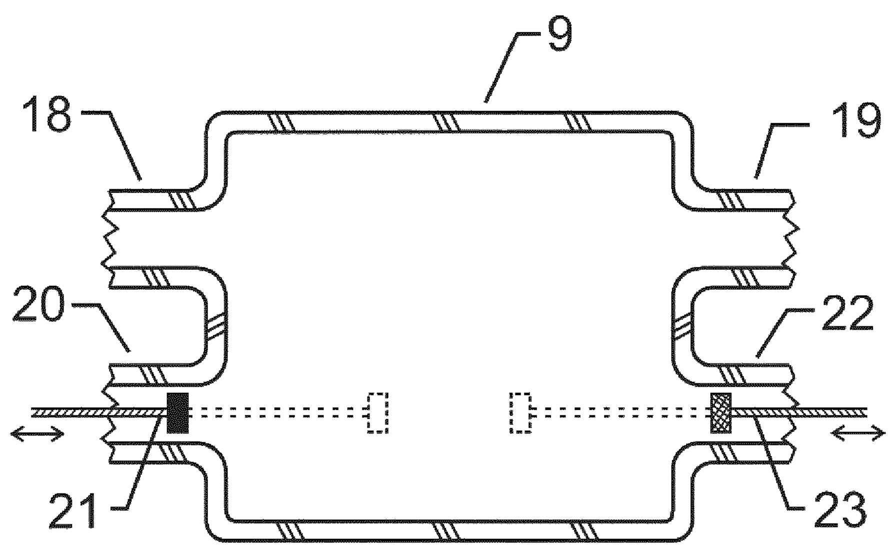
FIG. 7 shows a schematic of the setup suitable for growing CNWs according to Example 2.

Example 2 discloses a configuration suitable for the synthesis of $CO_xO_y$ gaseous molecules. The setup shown in FIG. 5 was modified in order to allow for independent exposure of carbon-containing precursor material and heated substrate to gaseous plasma. Altogether, the experimental setup is similar to the one in FIG. 5 for Example 1, except for the arrangement of the reaction chamber 9. The reaction chamber 9 used in Example 2 is schematically shown in FIG. 7. The reaction chamber 9 is equipped with several ducts. Duct 18 is used for pumping the reaction chamber 9. Duct 19 is used for leaking the oxygen-containing gas into the reaction chamber 9. Duct 20 is used for placing a holder with carbon-containing precursor material 21 into the reaction chamber 9. The holder with carbon-containing precursor material 21 is movable so it is either placed in the duct 20 or placed inside the reaction chamber (dashed position in FIG. 7). The holder with carbon-containing precursor material 21 may be externally heated using any suitable method including but not limited to resistive heating, inductive heating or irradiation with photons, electrons or ions.

The holder with carbon-containing precursor material 21 was mounted in the position inside the duct 20. The reaction chamber 9 was first evacuated to pressure below 1 Pa by the vacuum pump 10. Then, the pump was separated from the reaction chamber 9 by closing the gate valve 11. Carbon dioxide from the high-pressure container 12 was leaked into the evacuated reaction chamber 9 using the leak valve 13 until a pressure of 30 Pa was reached in the reaction chamber 9. When the pressure of 30 Pa was reached, the leak valve 13 was closed. Then plasma was created inside the reaction chamber 9 using the RF generator 14. The holder with carbon-containing material 21 was moved from the position inside the duct 20 into the center of the reaction chamber 9. The position of the holder with carbon-containing material 21 in the center of the reaction chamber 9 is marked in FIG. 7 with dashed line. Plasma inside the reaction chamber 9 was characterized by optical spectroscopy. The spectrum of the plasma in reaction chamber was dominated by atomic oxygen lines as long as the holder with carbon-containing material 21 was mounted in the position of the duct 20. The ratio between oxygen line at 777 nm and the most intensive line of $C_2$ band was about 7, as long as the holder with carbon-containing material 21 was mounted in the position inside the duct 20. When the holder with carbon-containing material 21 was moved from the position inside the duct 20 into the center of the reaction chamber 9—dashed position in FIG. 7—the ratio between oxygen line at 777 nm and the most intensive line of $C_2$ band dropped to 0.5 within a second, indicating bonding of oxygen to stable $C_xO_y$ gaseous molecules. The method disclosed in Example 2, therefore enables synthesis of stable $C_xO_y$ gaseous molecules, which are considered to be beneficial for growth of CNWs.

Example 3

Example 3 discloses a configuration suitable for synthesis of CNWs from $CO_xO_y$ gaseous molecules. The setup shown schematically in FIG. 5 was modified in order to allow for independent exposure of carbon-containing material and heated substrate to gaseous plasma. The reaction chamber 9 useful for Example 3 is shown for the relevant details schematically in FIG. 7. The reaction chamber 9 is equipped with several ducts. Duct 18 is used for pumping the reaction chamber 9. Duct 19 is used for leaking the oxygen-containing gas into the reaction chamber 9. Duct 20 is used for placing the holder with carbon-containing material 21 into the reaction chamber 9. Duct 22 is used for placing the holder with substrate 23 into the reaction chamber 9. The holder with substrate 23 is movable so it is either placed inside the duct 22 or inside the reaction chamber (dashed position in FIG. 7). The holder with substrate 23 may be externally heated using any method including but not limited to resistive heating, inductive heating or irradiation with photons, electrons or ions.

The holder with substrate 23 was mounted in the position of the duct 22. The $C_xO_y$ gaseous molecules were synthesized according to the procedure disclosed in Example 2. When the $C_xO_y$ gaseous molecules were created in the reaction chamber, the discharge was turned off, and the holder with carbon-containing material 21 was moved to the position inside the duct 20. Such configuration with the discharge turned off was kept for several minutes. Then, the holder with the substrate 23 was moved to the dashed position inside the reaction chamber 9, as shown in FIG. 7, and the discharge was turned on. As soon as the discharge was turned on and the holder with the substrate 23, at the dashed position in FIG. 7, heated to the elevated temperature of 500° C., CNWs started growing on the holder with the substrate 23 at the growth rate of almost 100 nm per second, similar as in Example 1.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the aspects of the disclosed embodiments in diverse forms thereof.

While the present disclosure has been described in conjunction with the exemplary embodiments described above, many equivalent modifications and variations will be apparent to those skilled in the art when given this disclosure. Accordingly, the exemplary embodiments of the present disclosure set forth above are considered to be illustrative and not limiting. Various changes to the described embodiments may be made without departing from the spirit and scope of the present disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example ±10%.

REFERENCES

A number of publications are cited above in order to more fully describe and disclose the embodiments and the state of the art to which the present disclosure pertains. Full citations for these references are provided below. The entirety of each of these references is incorporated herein.

Y. Wu, P. Qiao, T. Chong and Z. Shen, Carbon nanowalls grown by microwave plasma enhanced chemical vapor deposition, Advanced Materials vol. 14, No 1 (2002).
BJ Yang et al., Nano Letters Vol 2 Iss 7, p. 751-754 (2002).
K. Shiji et al, Diamond and Related Materials Vol 14 Iss. 3-7, p 831-834 (2005).
K. Tanaka et al., Japanese Journal of Applied Physics Vol. 44 Iss. 4A, p. 2074-2076 (2005).
Itoh et al. Thin Solid Films Vol. 501 Iss. 1-2, p. 314-317 (2006).
Dikonimos et al. Diamond and Related Materials Iss. 4-7 p 1240-1243 (2007).
S. Shimabukuro et al., Effect of hydrogen dilution in preparation of CNW by hot-wire CVD, Thin Solid Films Vol 516 Iss. 5 p. 710-713 (2008).
US 2007/184190A1
JP 2008 063196A
US 2011/045207A1
US 2009/274610A1
CN 103420354 A
WO 2016/024301A1
US 2011/0033367A1
KR 200631291A
JP 2008 239369A
US 2008/274392A1
JP 2010 009980A
JP 2010 009980A
CN 102668180A
US 2014/170490A1
TW 2014 48327A
CN 102668181A
US 2010/212728A1
US 2012/175515A1
JP 2015 118348A
WO 2016/059024A1
CN 103935975A
CN 103935982A
CN 103935983A
US 2014/127411A1

The invention claimed is:

1. A method for depositing a layer of CNWs on a substrate using a CO cycle, the method comprising:

providing a carbon-containing precursor material in condensed form in the reaction chamber;

providing an oxygen-containing atmosphere in the reaction chamber;

forming a plasma discharge in the oxygen-containing atmosphere in the reaction chamber;

wherein CO molecules in the plasma discharge interact with the carbon-containing precursor material to form $CO_xO_y$ molecules, the $CO_xO_y$ molecules diffusing to the substrate and decomposing at the substrate to form CO molecules and carbon, the carbon building up CNWs.

2. A method according to claim 1 wherein the CO molecules formed at the substrate by decomposition of the $CO_xO_y$ molecules subsequently diffuse to the carbon-containing precursor material to form further $CO_xO_y$ molecules.

3. A method according to claim 1 wherein at least some of the $C_xO_y$ gaseous molecules are charged, thereby being accelerated in a sheath between the plasma and the substrate before interacting with the substrate, thereby promoting the formation of CNWs.

4. A method according to claim 1 wherein $x>y$.

5. A method according to claim 1 wherein $x\geq 2$.

6. A method according to claim 1 wherein $y\geq 1$.

7. A method according to claim 1 wherein the substrate is heated to a temperature in the range 100-1500° C.

8. A method according to claim 1 wherein the substrate is heated to a temperature in the range 700-1000° C.

9. A method according to claim 1 wherein the carbon-containing precursor material is heated to a temperature greater than 100° C.

10. A method according to claim 1 wherein the carbon-containing precursor material is heated to a temperature greater than 300° C.

11. A method according to claim 1 wherein the pressure in reaction chamber during deposition of CNWs is between 1 and 100 Pa.

12. A method according to claim 1 wherein the oxygen-containing atmosphere in the reaction chamber is free of hydrogen-containing gas.

13. A method according to claim 1 wherein the growth rate of the CNWs is more than 1 nm/sec.

14. A method according to claim 1 wherein the growth rate of the CNWs is at least 10 nm/sec.

15. A method for depositing a layer of CNWs on a substrate, the method comprising:

providing an atmosphere containing $CO_xO_y$ molecules in a reaction chamber;

providing a substrate in the reaction chamber;

forming a plasma discharge in the atmosphere containing $CO_xO_y$ molecules in the reaction chamber;

wherein $CO_xO_y$ molecules diffuse to the substrate and decompose at the substrate to form CO molecules and carbon, the carbon building up CNWs.

* * * * *